3,037,975
**EXTRACT SUBSTANCES AND PROCESS FOR RE-
COVERING THEM FROM AQUEOUS CITRUS-
FRUIT PROCESSING LIQUORS**
Ruth Cohn, 21 Hatikvah St., Ramat Gan, Israel
No Drawing. Filed Oct. 3, 1960, Ser. No. 59,830
Claims priority, application Israel Dec. 31, 1959
8 Claims. (Cl. 260—236.6)

This invention has the object to provide a method of working up certain aqueous liquors of the citrus fruit products industry with a view to recovering therefrom a mixture of flavouring and colouring substances. This mixture also contains a proportion of essential oils which is lost in the conventional essential oil extraction processes.

In one of the principal methds of processing fresh citrus fruit, the essential oils are extracted by an operation which includes pricking the oil-bearing layer of the peel of the uncut fruit and washing the fruit with a large amount of water, which removes practically all of the essential oil. The fruit is then cut and further processed for recovering the juice and making the normal byproducts. From the aqueous extract containing the essential oil, about 90% of the latter is separated by centrifuging. The aqueous residue is rejected as a waste, for no satisfactory method for recovering the remaining oil therefrom has existed up to now.

In a second principal method of processing fresh citrus fruit a tubular knife is pushed into the fruit and the fruit is subjected to strong pressure, whereby the juice is drained through the tubular knife and at the same time the oil cells of the peel are burst and a mixture of essential oils and aqueous peel juice is recovered separately from the fruit juice. This mixture is centrifuged whereby about 90% of the oil is separated while about 10% thereof is lost with the aqueous waste liquor.

In some cases the fruit is first cut into halves, the fruit juice is extracted, and a mixture of essential oils and peel juice is recovered thereafter from the peel.

The invention is based on the new observation that aqueous liquors obtained from citrus fruit peel in the course of any of the conventional processes of recovering the essential oils, or simply by crushing the peel and, if desired, washing it thereafter with water or with aqueous liquids, contain not only the essential oils, or so much as is left therein after the separation of the bulk of the oils, but also a mixture of hitherto unknown flavouring and colouring substances. These substances which, for the sake of brevity, will be referred to hereinafter as "extract substances," can be recovered by an appropriate treatment of the aqueous liquor. For the sake of brevity, all these aqueous liquors will be called hereinafter "aqueous peel liquor."

It is known that by a process usually called "liming," citrus fruit peel yields an aqueous liquor which contains virtually the whole of the water-soluble extract substances of the peel. The liming process destroys the colloidal structure of the peel, and more particularly of the albedo thereof, and thereby liberates the aqueous system containing the water-soluble substances, which are otherwise retained by the albedo and cannot be separated from the peel even by the application of high pressure. In connection with such liming processes it has also been proposed to acidulate and heat the aqueous liquor thus separated from the solids and thereby to precipitate water-insoluble calcium salts in mixture with some undefined substances. This precipitate is not usable and has to be rejected.

In the process according to the present invention, the aqueous peel liquor is obtained by a mere mechanical treatment of the peel, affecting mainly the oil-bearing flavedo. This aqueous peel liquor contains but little of the water-soluble extract substances of the peel which are retained by the undestroyed colloidal structure of the albedo.

The invention, therefore, consists in a method of recovering flavouring and colouring substances and/or essential oils from aqueous peel liquors (as herein defined) obtained from the peel by a mechanical treatment to the exclusion of liming, wherein the pH of the aqueous peel liquor is adjusted to not above 5.5 and preferably not below 2 and the liquor is warmed to a temperature within the range between about 35° C. and boiling temperature.

Almost at once after the pH and temperature of the liquor have thus been adjusted, a supernatant layer of pasty consistency separates from the aqueous liquor.

This top layer (which is called hereinbelow "product" for short) is separated from the aqueous layer and can then be further processed in various ways.

The order in which the pH adjustment and heating are performed is immaterial, and both operations may be even carried out concurrently.

There is no theoretical lower limit for the pH adjustment; the figure of pH=2, is showever, a practical limit, for on the one hand the desired separation of the extract substances and essential oils from the aqueous liquor is fully achieved within the pH range from 2 to 5.5 and can not be improved by even more strongly acidulating the liquor so that any amount of acid added beyond the pH limit of 2 is wasted, and on the other hand, a stronger acidity may adversely affect the extract substances and also create unnecessary acid-proofing problems as regards the apparatus, pipes and pumps used in the performance of the method on a commercial scale.

It is usually preferred first to free the product from the bulk of the original aqueous liquor. This can be done by washing with water, whereby the proportion of water contained in the separated product is kept more or less constant. Or the mass may be partly de-watered by squeezing or centrifuging, preferably after having first been washed. The washing operation removes a bitter principle which would be undesired in some of the uses to which the extract substances can be put. The washing operation can be accelerated by being carried out with warm water, e.g. of about 70° C. It is sometimes desired to alkalize the washing water, e.g. to a pH of up to 8.

The product, either washed or unwashed, may be freed of part or almost the whole of the essential oils which, if desired, can thus be recovered separately. This can be achieved by heating the product dry and collecting the vapours thereby formed. Or else the product may be immersed in water, preferably in a quantity larger than that of the product. The water is then distilled either under atmospheric pressure or in vacuo, whereby the essential oil is made to distil with the water. It can be collected from the distillate from which it separates.

Yet another method of removing the essential oils from the product consists in passing water steam through the product, or through a mixture of the product with water.

With or without the removal of the essential oil, the product can be used as an ingredient in natural or synthetic beverage or food compositions, especially those prepared from citrus fruit. The product imparts to such compositions an enhanced colour and flavour. In addition it increases the cloudiness and has a colour and taste preserving effect which is believed to be due to an anti-oxidizing action of the product.

For example, if the product is added to citrus fruit juice concentrate, the beverages produced by the dilution of the concentrate with water have a more intense colour and a better cloudiness, and their flavour, which is impaired by the loss of volatile substances in the course of the concentration, is much improved.

In a similar manner the extract substances, with or without the essential oil, may be admixed, for example, to such citrus fruit products as are known commercially as "crystals" (the matter obtained by the evaporation of citrus fruit juice to dryness), or "comminuted juice," i.e. comminuted whole fruit, both of which are starting materials for the manufacture of beverages and other food.

Where the extract substances according to the invention are used as an ingredient in food, it is desired to use an edible acid for the adjustment of the pH of the aqueous peel liquor, e.g. critic, lactic or tartaric acid. However, some mineral acids may be used for this purpose, e.g. phosphoric acid or hydrochloric acid.

The composition of the extract substances according to the invention has not yet been fully elucidated, but it appears that they contain carotinoids, bioflavonoids, volatile esters, stearoptenes and pectin or pectin derivatives.

For use as an ingredient in food the extract substances according to the invention can be preserved in various ways. A particularly suitable preserving method consists in mixing the extract substance, with or without the essential oil originally contained in the product separated from the aqueous liquor, with citrus fruit juice, juice concentrate or "comminuted juice," e.g. in a proportion of 1:1, or a similar ratio containing a high proportion of the extract substances, and pasteurizing the mixture. This mixture keeps for a very long time if protected from the access of micro-organism, and preferably also of oxygen. In certain cases such mixtures keep well even without being pasteurized, for example, if they contain the extract substances admixed with a particularly high concentrated fruit juice, or with a highly concentrated sugar solution.

If desired, the product obtained from the aqueous peel liquor in accordance with this invention can be processed in such a manner that the essential oils alone are recovered, if for any reason it is not desired to recover the extract substances. In this case the product may be admixed with a comminuated inert matter such as silica, kieselguhr, wood flour or the like, and the mixture may be subjected to high pressure whereby the essential oil is squeezed out. The cake has in that case to be rejected.

The invention is illustrated by the following examples to which it is not limited.

*Example 1*

1000 l. of aqueous waste liquor obtained from the recovery of essential oil from whole fruit by puncturing the peel and washing the essential oils out with water and containing about 0.1% of essential oil, is acidulated with citric acid to pH=4 and then warmed to 70° C. A product of a pasty consistancy separates as a top layer. It is removed from the aqueous liquor. The amount of moist product thus removed is about 11 kg., containing about 1kg. of essential oil.

The product is washed with 100 liters of water of 70° C. alkalized with NaOH to pH=8, and freer from the washing water, whereby its original moist weight of 11 kg. remains substantially unchanged.

*Example 2*

120 l. of aqueous waste liquor obtained from the recovery of essential oil from whole fruit by the second principal method of processing fresh fruit mentioned above and containing about 5% of essential oil, is acidulated with phosphoric acid to pH=3 and heated to 55° C. A product of a pasty consistency separates as a top layer. This product contains 800 g. of essential oil beside 8 kg. (moist weight) of extract substances.

*Example 3*

Citrus fruit peel remaining after the extraction of the juice by means of conventional reamers is shredded and pressed under high pressure, whereby the aqueous peel juice in admixture with the bulk of the essential oils is squeezed out.

500 l. of this mixed liquor is acidulated with tartaric acid to pH=4.5 and heated to 38° C.

The supernatant layer has a moist weight of about 15 kg. and is composed of nearly equal weight of extract substances and essential oil.

By an alternative method, the peel juice obtained in the manner described above can first be freed from the major part of the essential oils by any suitable conventional method, e.g. centrifuging. The product according to the invention, recovered from the waste liquor remaining after the recovery of the essential oils is then substantially similar to the product obtained in accordance with eight Example 1 or Example 2.

*Example 4*

The washed product obtained in accordance with any of Examples 1 to 3 is used as an ingredient in citrus fruit beverages or food products as follows:

(a) 30 g. of the product is admixed to 1 kg. of orange or grape fruit juice concentrate 1:6;
(b) 25 g. of the product is admixed to 1 kg. of orange or grape fruit "comminuted juice";
(c) 8 g. of the product is admixed to 1 liter of fresh citrus fruit juice.

*Example 5*

The washed product obtained in accordance with any of Examples 1 to 3 is dried at 60° C. The dried product can be used as an addition to citrus fruit preparations in any of the ways described in Example 4, or as an addition to oranges, grape fruit or lemon "crystals."

*Example 6*

The washed product obtained in accordance with any of Examples 1 to 3 is admixed, in a proportion of 1:1 by weight, with orange or grape fruit juice concentrate and the mixture is pasteurized by being heated to 95° C. for 1 minute. The pasteurized mixture is kept in hermetically closed containers or wrappers, e.g. heat-sealed polyethylene bags. It can be used at any time as an ingredient in food similarly as described in Example 2.

*Example 7*

The produce obtained in accordance with any of Examples 1 to 3, which may or may not be washed, is mixed with an equal weight of water and the mixture is heated to boiling in a distillation vessel. The essential oil contained in the product is distilled off with water and collects in the distillate as a separate top layer.

*Example 8*

The product obtained in accordance with any of the Examples 1 to 3 is mixed with four times its weight of water of 60° C. and the mixture is centrifuged, whereby the essential oil is separated.

*Example 9*

25 g. of the product obtained in accordance with any of Examples 1 to 3 is emulsified with 200 g. of a 50% by weight sugar solution with the addition of 1 g. of carboxy-methyl cellulose as an emulsifier, and the mixture is made up with water to a volume of 1 liter. The taste can be corrected at will by the addition of citric acid or any other flavouring substance. The beverage thus prepared is carbonated.

*Example 10*

20 g. of the product obtained in accordance with any of Examples 1 to 3 is mixed with 100 cc. of a 2% by weight aqueous carboxymethyl cellulose solution and a conventional food preserving agent. The mixture is a viscous paste and can serve as a base for the preparation of beverages by mere dilution with water.

I claim:

1. A method of processing aqueous liquors obtained from citrus fruit peel by a mechanical treatment, comprising adjusting the pH of the liquor to at most 5.5, warming the liquor to a temperature in the range between about 35° C. and boiling temperature, thereby causing a product of pasty consistency to separate from the liquor and to collect as a top layer on the liquor, and removing said pasty product from the liquor.

2. A method of processing aqueous liquors obtained from citrus fruit peel by a mechanical treatment, comprising adjusting the pH of the liquor to at most 5.5, warming the liquor to a temperature in the range between about 35° C. and boiling temperature, thereby causing a product of pasty consistency to separate from the liquor and to collect as a top layer of the liquor, removing said pasty product from the liquor and washing the pasty product with warm, alkalized water.

3. A method of processing aqueous liquors obtained from citrus fruit peel by a mechanical treatment, comprising adjusting the pH of the liquor to at most 5.5, warming the liquor to a temperature in the range between about 35° C. and boiling temperature, thereby causing a product of pasty consistency to separate from the liquor and to collect as a top layer on the liquor, removing said pasty product from the liquor and separating essential oil from said pasty product.

4. A method of processing aqueous liquors obtained from citrus fruit peel by a mechanical treatment, comprising adjusting the pH of the liquor to at most 5.5, warming the liquor to a temperature in the range between about 35° C. and boiling temperature, thereby causing a product of pasty consistency to separate from the liquor and to collect as a top layer on the liquor, removing said pasty product from the liquor and recovering essential oil from said pasty product by distillation.

5. A method according to claim 4, wherein the recovery of the essential oil from said pasty product comprises distilling water from said product and separating essential oil from the distillate.

6. A method according to claim 4, wherein the recovery of the essential oil from said pasty product comprises passing water stream through said product, thereafter condensing and collecting the steam as a distillate and separating essential oil from said distillate.

7. A method according to claim 3, wherein the pasty product separated from the liquor is admixed with a comminuted inert material and the mixture is pressed for recovering essential oil from said mixture.

8. A method of processing aqueous liquors obtained from citrus fruit peel by a mechanical treatment, comprising adjusting the pH of the liquor to within the range between 2 and 5.5, warming the liquor to a temperature in the range between about 35° C. and boiling temperature, thereby causing a product of pasty consistency to separate from the liquor and to collect as a top layer on the liquor, and removing said pasty product from the liquor.

No references cited.